(12) United States Patent
Gebele et al.

(10) Patent No.: US 6,369,402 B1
(45) Date of Patent: Apr. 9, 2002

(54) DEVICE AND METHOD FOR READING INFORMATION STORED IN A PHOSPHOR LAYER

(75) Inventors: Herbert Gebele, Sauerlach (DE); Paul Leblans, Kontich (BE); Jürgen Müller, München; Ralph Thoma, Augsburg, both of (DE)

(73) Assignee: Agfa-Gevaert AG, Leverkusen (DE)

( * ) Notice: Subject to any disclaimer, the term of this patent is extended or adjusted under 35 U.S.C. 154(b) by 0 days.

(21) Appl. No.: 09/449,877

(22) Filed: Nov. 30, 1999

(30) Foreign Application Priority Data

Dec. 23, 1998 (DE) .......................................... 198 59 747

(51) Int. Cl.[7] .............................................. G03B 42/08
(52) U.S. Cl. ...................................... 250/585; 250/586
(58) Field of Search .................................. 250/584, 585, 250/586

(56) References Cited

U.S. PATENT DOCUMENTS

| | | | | |
|---|---|---|---|---|
| 4,507,562 A | * | 3/1985 | Gasiot et al. ............. | 250/484.1 |
| 4,922,103 A | | 5/1990 | Kawajiri et al. ......... | 250/327.2 |
| 4,931,642 A | * | 6/1990 | Hosoi et al. .............. | 250/327.2 |
| 4,953,038 A | | 8/1990 | Schiebel et al. ............ | 358/471 |
| 5,530,260 A | * | 6/1996 | Arakawa ..................... | 250/586 |
| 6,255,660 B1 | * | 7/2001 | Isoda et al. .............. | 250/585 X |

FOREIGN PATENT DOCUMENTS

| | | | |
|---|---|---|---|
| DE | 42 22 946 A1 | 1/1994 | |
| EP | 0751200 A1 | 1/1997 | |
| EP | 0863657 A2 | 9/1998 | .......... H04N/1/195 |

OTHER PUBLICATIONS

*Contemporary Optics For Scientists and Engineers*, Nussbaum et al., Prentice–Hall, Inc., Englewood Cliffs, N.J.
*System Considerations in CCD–based X–ray Imaging for Digital Chest Radiography and Digital Mammography*, Hejazi and Trauernicht., Med. Phys. 24(2), Feb. 1997.

* cited by examiner

*Primary Examiner*—Huy Mai
(74) *Attorney, Agent, or Firm*—Darby & Darby

(57) ABSTRACT

A device (1) and a method for reading information stored in a phosphor layer (10) is disclosed. The device (1) includes a transparent carrier material (9) on which the phosphor layer (10) to be read is disposed. A radiation source (2) emits an excitation radiation (20) to excite the phosphor layer (10), which in turn emits an emission radiation (26). The emission radiation (26) can be received by a receiver (3). The radiation source (2) is arranged on one side of the transparent carrier material (9), whereas the receiver (3) is arranged on the other side of the transparent carrier material (9), thereby defining an optical path between the radiation source (2) and the receiver (3). According to the invention, a reflective layer (21, 22; 30, 31, 32) for reflecting at least a portion of the excitation radiation (20) is arranged in the optical path.

14 Claims, 2 Drawing Sheets

DEVICE AND METHOD FOR READING INFORMATION STORED IN A PHOSPHOR LAYER

BACKGROUND OF THE INVENTION

1. Field of the Invention

The present invention relates to a device and a method for reading information stored in a phosphor layer wherein an excitation radiation is emitted in the direction of a transparent carrier material having disposed thereon the phosphor layer to be read, the phosphor layer in response emits an emission radiation and the emission radiation emitted by the phosphor layer is received.

In particular for medical purposes, an image is generated of an object, for example a patient, using x-rays, wherein the image is stored in a phosphor layer as a latent image. To read the x-ray image stored in the phosphor layer, the phosphor layer is excited by a radiation source. This excitation by the radiation sauce causes the phosphor layer to emit light having an intensity corresponding to the x-ray image stored in the phosphor layer. The light emitted by the phosphor layer is received by a receiver, so that the x-ray image stored in the phosphor layer can be made visible. The x-ray image can, for example, be shown directly on a monitor. Alternatively, the x-ray image can also be recorded on a photographic x-ray film specifically designed for capturing x-ray images.

The phosphor layers are typically applied to a carrier material which may be either transparent or reflective. If the carrier material is reflective, then the radiation source and the receiver are arranged on the same side of the carrier material, i.e., on the side of the carrier material on which the phosphor layer is applied.

If the phosphor layer is arranged on a transparent carrier material, then the radiation source is positioned on one side of the carrier material, while the receiver are positioned on the opposite other side of the carrier material. This arrangement is advantageous in that a larger portion of the radiation emitted by the excited phosphor layer can be received by the receiver. As a result, the x-ray image stored in the phosphor layer is reproduced with a better quality.

2. Description of the Related Art

U.S. Pat. No. 4,953,038 discloses a device for reading a phosphor layer arranged on a transparent record carrier. In the disclosed device, a light source is positioned on that side of the transparent record carrier which does not include the phosphor layer. The light source illuminates a partial area of the phosphor layer. The record carrier together with the applied phosphor layer can be moved relative to the light source. The light source simultaneously illuminates a plurality of adjacent pixels of the phosphor layer which are arranged in the form of a two-dimensional array and excites the phosphor layer, causing the phosphor layer to emit light. The light emitted by the phosphor layer is captured by an optical fiber arrangement which is located on the side of the record carrier having the phosphor layer. The light collected by the optical fiber arrangement is subsequently conveyed to a charge coupled device, CCD. The CCD is used to detect an image of the information stored in the phosphor layer. When this method is used for reading the information stored in the phosphor layer, light emitted by the radiation source and exciting the phosphor layer may disadvantageously also be collected by the optical fiber arrangement and conveyed to the CCD. This tends to introduce noise in the x-ray image which is detected by the CCD. To prevent the introduction of noise, U.S. Pat. No. 4,953,038 proposes to place a filter in the optical path between the phosphor layer and the CCD, wherein the filter suppresses those wavelengths which are not a part of the radiation emitted by the phosphor layer. This arrangement prevents the light emitted by the radiation source from reaching the CCD. However, such filter disadvantageously tends to be relatively thick, with the filter thickness typically exceeding 0.3 mm. The light emitted by the phosphor layer may be scattered when passing through the filter. As a result, the CCD may not be able to detect the exact location from which the light is collected. In addition, radiation emitted by the phosphor layer may even be "lost" when passing through the filter and may thus escape detection by the CCD. The visual representation of the x-ray image may therefore be distorted and of poor quality.

SUMMARY OF THE INVENTION

It is therefore an object of the present invention to provide a device and a method for reading information stored in a phosphor layer which reproduce the information with an improved quality.

The object is solved by disposing a reflective layer in the optical path between the radiation source and the receiver for reflecting at least a portion of the excitation radiation.

According to one aspect of the invention, at least a portion of the excitation radiation used to excite the phosphor layer is reflected. For this purpose, a reflective layer capable of reflecting the excitation radiation is placed between the radiation source and the receiver. Such reflective layers have typically a thickness of $\lambda/4$ and are therefore much thinner than conventional filter layers. $\lambda$ refers here to the wavelength of the excitation radiation which is to be predominantly reflected by the reflective layer. The construction of the reflective layer depends on the spectral characteristics of the excitation radiation and the desired reflected wavelength. The reflective layer can be designed for a specific application. Alternatively, several reflective layers, which may be designed for different wavelengths to be reflected may be arranged in the optical path between the radiation source and the receiver. The reflective layers are of conventional design and are advantageously prepared in the form of so-called "thin layers." Reflective layers of this type are described, for example, in the optical treatise "Contemporary Optics for Scientists and Engineers" by Ellen Nussbaum et al., Prentice-Hall, Inc., Englewood Cliffs, N.J. 1976, pp. 182 to 198, and in the treatise "Technische Optik" by Prof. Gottfried Schröder, Vogelbuch-Verlag, Würzburg, 6. Edition, pp. 108 to 110.

The reflective layer need not be designed to completely reflect the entire excitation radiation emitted by the radiation source. Rather, the reflective layer may be tailored to certain wavelength regions of the excitation radiation. For example, wavelength regions of the infrared spectral region which do not contribute to excitation of the phosphor layer may be removed from the excitation radiation before the excitation radiation impinges on the phosphor layer.

It may also be possible, as disclosed in U.S. Pat. No. 4,953,038, to arrange—in addition to a reflective layer—a filter in the optical path between the phosphor layer and an imaging means for absorbing the excitation radiation. The imaging means for imaging the radiation emitted by the phosphor layer may be implemented, for example, in the form of an optical fiber arrangement. Such an optical fiber arrangement has the additional advantage over the arrangement disclosed in U.S. Pat. No. 4,953,038 that the filter layer can be made thinner, so that a greater portion of the radiation emitted by the phosphor layer can be collected and imaged on the receiver. Because scattering of the emitted radiation is also reduced, the image is sharper and of higher quality.

According to an advantageous embodiment of the invention, the phosphor layer includes a special phosphor with a special crystalline needle-shaped structure. A phosphor of this type is known, for example, from the European patent application EP 0 751 200 A1. This special phosphor has a plurality of "needles" which guide both the excitation radiation and the emitted radiation. The phosphor is prepared by growing crystalline "needles" having a base area of approximately between 1 and 25 $\mu m^2$ and a height corresponding to the desired layer thickness of the phosphor layer. Excitation radiation impinging normal to the surface of the phosphor layer is guided in each "needle" essentially without being scattered until reaching a color center in the crystal lattice in which the information is stored. The emitted radiation produced through excitation of the color center is guided in the respective "needle." Depending on the reflective index between the "needles," the respective emitted radiation is a reflected and guided out of the "needle." By using this special phosphor, scattering of the excitation radiation inside the phosphor carrier is practically eliminated. It particular, with information stored in the phosphor layer being read out row-by-row, scattering of the excitation radiation perpendicular to the row direction can be detrimental, since color centers can also be excited which are located in a row of the phosphor layer different from the row currently being read. Consequently, image radiation can "get lost," i.e., cannot be detected by the receiver. Scattering of the emission radiation within the phosphor carrier layer is also eliminated, so that the emitted radiation can be detected by the receiver with excellent spatial resolution.

The reflective layer arranged between the phosphor layer and the receiver reflects the excitation radiation which passes through the transparent carrier and the phosphor layer and reintroduces the excitation radiation into the phosphor layer. As a result, the color centers in the phosphor layer are once more excited and emit radiation. Accordingly, the phosphor layer emits an increased amount of radiation which can then be detected by the receiver. This reproduces the information with better quality and enhanced sharpness.

According to another advantageous embodiment of the invention, a reflective layer for reflecting the emission radiation emitted by the phosphor layer is arranged between the radiation source and the phosphor layer. This reflective layer reflects the emission radiation, which is emitted by the phosphor layer towards the side of the phosphor layer facing away from the receiver, towards the receiver. The reflected radiation can thus also be detected by the receiver, further improving the reproduction of the information.

Other objects and features of the present invention will become apparent from the following detailed description considered in conjunction with the accompanying drawings. It is to be understood, however, that the drawings are intended solely for purposes of illustration and not as a definition of.

BRIEF DESCRIPTION OF THE DRAWINGS

Is the following, the invention and its advantages are described with reference to embodiments and the drawings.

DETAILED DESCRIPTION OF THE PRESENTLY PREFERRED EMBODIMENTS

Figure 1:
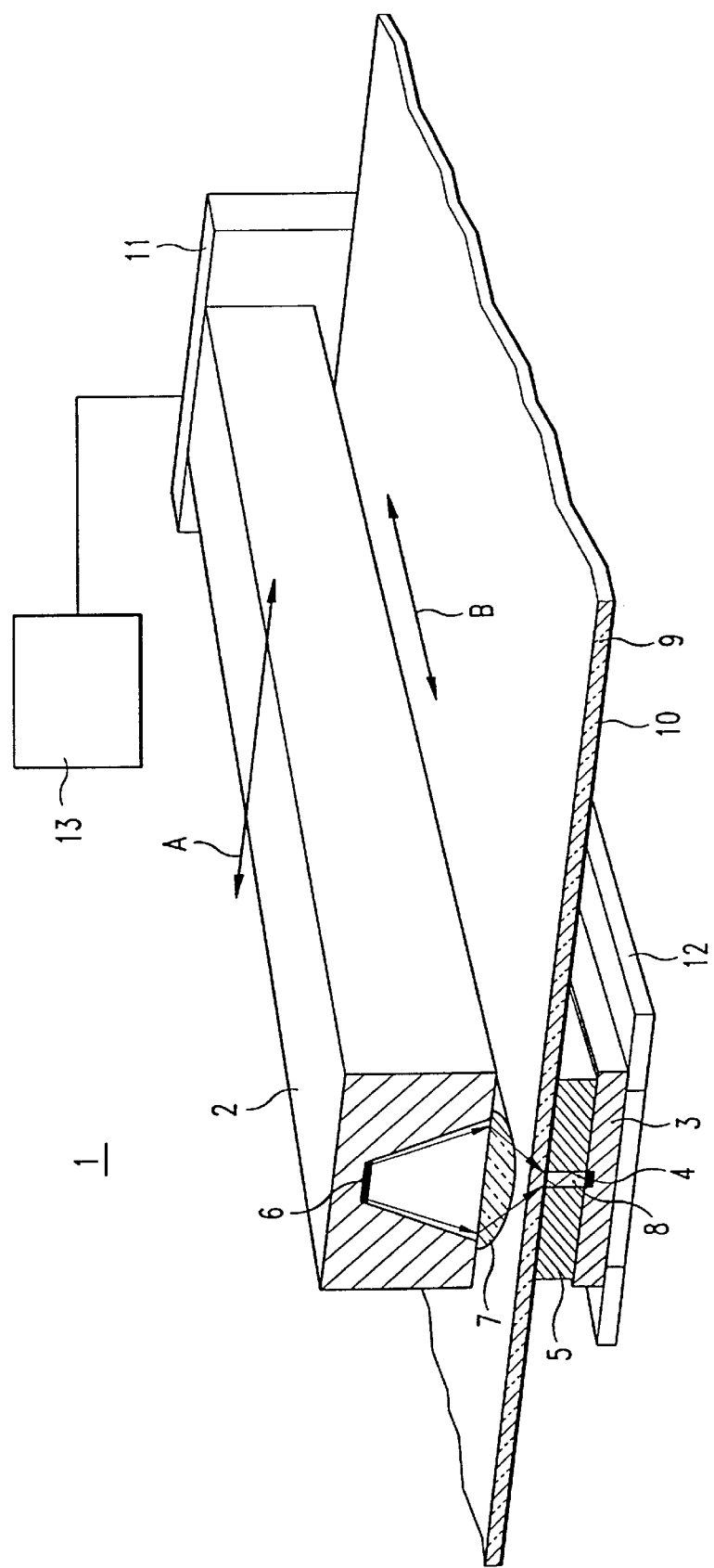
FIG. 1 shows a perspective schematic diagram of a first embodiment of a reading device according to the invention for reading information stored in a phosphor layer.

In the following, identical reference numerals are used in the different embodiments for identical elements and elements performing an identical function.

FIG. 1 shows schematically a perspective diagram of the first embodiment of the device according to the invention for reading information stored in a phosphor layer. A reading device 1 is used to read image information from a phosphor layer 10. The image information is produced by irradiating the phosphor layer 10 with x-rays. The reading device I includes a radiation source 2 which in this embodiment is implemented as a line light source having a plurality of laser diodes arranged side by side. The line light source 2 of the present example includes 4096 laser diodes arranged in parallel in a row. The laser diodes can be used to excite a single row of the phosphor layer 10. An exemplary laser diode 6 is shown in FIG. 1. The laser diodes of the line light source 2 are oriented perpendicular to the phosphor layer 10, so that the radiation emitted by the individual laser diodes impinges directly on the phosphor layer 10. The line light source 2 essentially extends across the entire width B used to store the information in the phosphor layer 10. The line light source 6 having the laser diodes may be replaced by another radiation source suitable for exciting the phosphor layer 10. For example, a so-called "flying spot" radiation source can be used, wherein a laser beam emitted by a laser is aimed at a rotatable polygon mirror. The polygon mirror rotates, thereby directing the laser beam across a row of the phosphor layer and exciting a respective individual pixel of the row.

The phosphor layer 10 is applied to a transparent carrier material 9. A focusing lens 7 extending across the entire width of the line light source 2 is positioned between the transparent carrier material 9 and the line light source 2. The focusing lens 7 is used to focus the radiation emitted by the line light source 2 on the phosphor layer 10, so that an entire row of the phosphor layer 10 can be excited simultaneously.

The reading device 1 further includes a receiver 3 which is implemented as a linear "charge coupled device" (CCD) and receives emission radiation emitted by the phosphor layer. The linear CCD 3 has a plurality of photodetectors arranged in parallel side-by-side on a line. An exemplary representative photodetector 4 is illustrated in FIG. 1. The photodetectors photoelectrically convert the received optical radiation into electrical signals. The individual photodetectors represent pixels of the receiver 3. Each photodetector is adapted to receive optical radiation emitted by one of the excited pixels of the phosphor layer 10. In the exemplary embodiment of FIG. 1, 4096 individual photodetectors are provided on the linear CCD 3.

An optical fiber arrangement 5 extending over the entire width of the linear CCD is located between the phosphor layer 10 and the linear CCD 3. The optical fiber arrangement 5 consists of a plurality of parallel optical waveguides arranged side-by-side, which capture the radiation emitted by the individual excited pixels of the phosphor layer 10 and convey the radiation to the individual photodetectors of the linear CCD 3. A representative exemplary optical fiber of the optical waveguide is illustrated in FIG. 1 and given the reference numeral 8. Such optical fiber arrangements are known in the art and can be obtained, for example, in the form of so-called "fused fiber-optic faceplates" from the company Schott. Other imaging means, for example a so-called Selfoc lens array or an array of micro-lenses, can be used in lieu of the optical fiber arrangement 5.

The linear CCD 3 and the optical fiber arrangement 5 attached thereto are secured to a base plate 12. A connecting element 11 is provided on one side of the transparent carrier material 9. The connecting element 11 rigidly connects the line light source 2 and the base plate 12, including the linear CCD 3 and the optical fiber arrangement 5 attached thereto. This arrangement provides a rigid connection between the line light source 2 and the linear CCD 3, so that the images of the stored image information, i.e., the excitation of the phosphor and the reception of the emitted radiation, are exactly registered with respect to each other and the exact registration is maintained during the reading process. The entire reading arrangement for reading the information stored in the phosphor layer 10 can be moved in a displacement direction A using drive means 13 which can be implemented, for example, as a stepping motor or a linear motor. In this way, the entire phosphor layer 10 can be read by row-wise excitation and detection.

According to the invention, a reflective layer for reflecting the excitation radiation, which is emitted by the line light source 2, is placed in the optical path between the line light source 2 and the linear CCD 3.

Figure 2:
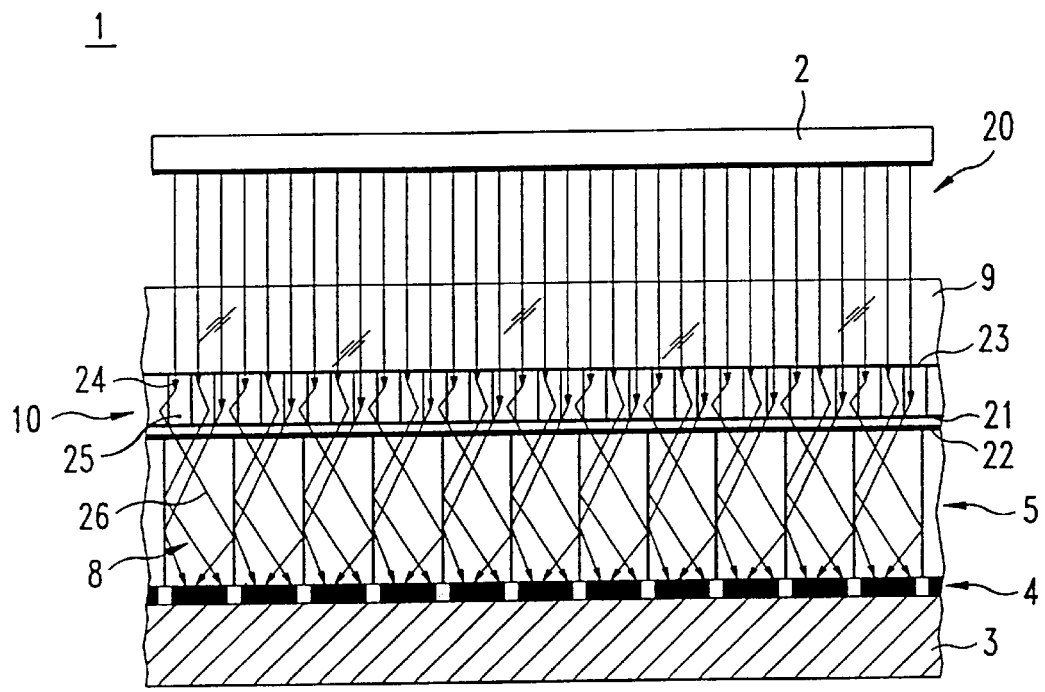
FIG. 2 shows a detailed schematic diagram of the inventive device according to the first embodiment viewed along a row.

FIG. 2 shows a more detailed schematic diagram of the first embodiment of the device according to the invention. FIG. 2 shows the reading device 1 of the invention as viewed along a row B. The line light source 2 emits a stimulation radiation 20 which passes through the transparent carrier 9 into the phosphor layer 10. When the stimulation radiation encounters a color center in the phosphor layer having image information stored therein, the respective color center is excited and emits light. Such exemplary color centers disposed in the phosphor layer 10 are indicated in FIG. 2 by a tipped arrow and the reference numeral 24. The emission radiation emitted by the phosphor layer 10 is captured by the optical fiber arrangement 5. FIG. 2 illustrates several optical fibers operating as light waveguides, with the reference numeral 8 referring to one of the optical fibers. The emission radiation emitted by the phosphor layer has the reference numeral 26. The optical fiber arrangement 5 is placed directly on the linear CCD 3 which includes the individual photodetectors 4. The light collected by the optical fiber arrangement 5 is then conveyed to the linear CCD 3.

The phosphor layer 10 has a needle-shaped crystalline structure. This is illustrated in FIG. 2 by a plurality of mutually parallel rectangles arranged side-by-side in the phosphor layer. Each rectangle represents a needle-shaped crystallite. An exemplary crystallite is indicated in FIG. 2 with the reference numeral 25. As mentioned above, the needle-shaped crystal structures can convey the stimulating radiation 20 which impinges perpendicularly on the carrier layer, to the color centers essentially without scattering losses. The needle-shaped crystal structures can also convey the radiation 26 emitted from the phosphor layer after excitation by the stimulating radiation essentially without scattering losses. It should be noted that the use a phosphor of this type is advantageous, but not essential for the present invention. The invention may also be practiced with a conventional phosphor which does not have a needle-shaped crystalline structure.

According to another aspect of the invention, a first reflective layer 21 is placed between the phosphor layer 10 and the optical fiber arrangement 5, with an additional second reflective layer 22 for the stimulating radiation 20 placed parallel thereto. With the two reflective layers 21 and 22, the stimulating radiation 20 which passes through the carrier material 9 and phosphor layer 10 is once again reflected into the phosphor layer 10. The so-reflected stimulating radiation thus once more excites color centers of the phosphor layer 10. This causes the phosphor layer 10 to emit a stronger emission radiation which can be detected by the linear CCD 3. This arrangement advantageously further enhances the quality of the reproduced x-ray image. The reflective layers 21 and 22 are so-called $\lambda/4$ layers which can be made very thin. As a result, the optical fiber arrangement 5 can be placed in close proximity to the phosphor layer 10, so that scattering of the radiation exiting the phosphor layer can be substantially eliminated. The major portion of the radiation emitted by the phosphor layer 10 is therefore collected by the optical fiber arrangement 5 which improves the representation of the x-ray image.

In the embodiment according to FIG. 2, two reflective layers 21 and 22 are arranged between the phosphor layer 10 and the optical fiber arrangement 5. For technical and physical reasons, such a reflective layer 21 and 22, respectively, is only capable of reflecting a certain maximal intensity of the stimulating radiation 20 impinging on the reflective layer 21, 22. In other words, a single reflective layer is only capable of reflecting a certain portion of the intensity of the stimulating radiation 20 required to excite the phosphor layer 10. A remaining portion of the stimulating radiation 20 may therefore still penetrate the first reflective layer 21 and be detected by the linear CCD 3, unless the second reflective layer 22 is provided to reflect the stimulating radiation 20 transmitted by the first reflective layer 21. However, only a single reflective layer or more than the two reflective layers 21 and 22 illustrated in the reading device of the invention may be provided, which may degrade or improve the image quality. Stimulating radiation detected by the linear CCD 3 introduces noise in the rendered x-ray image.

In the embodiment of the reading device 1 according to the invention illustrated in FIG. 2, an additional reflective layer 23 is disposed on the upper side of the phosphor layer 10, i.e., between the transparent carrier material 9 and the phosphor layer 10. The additional reflective layer 23 reflects the emission radiation emitted by the phosphor layer in the direction of the line light source 2. The emission radiation emitted in the direction of the line light source 2 is thus reflected by the additional reflective layer 23 and redirected into the phosphor layer 10. This arrangement increases the amount of emission radiation detected by the linear CCD 3 and improves the image quality.

Figure 3:
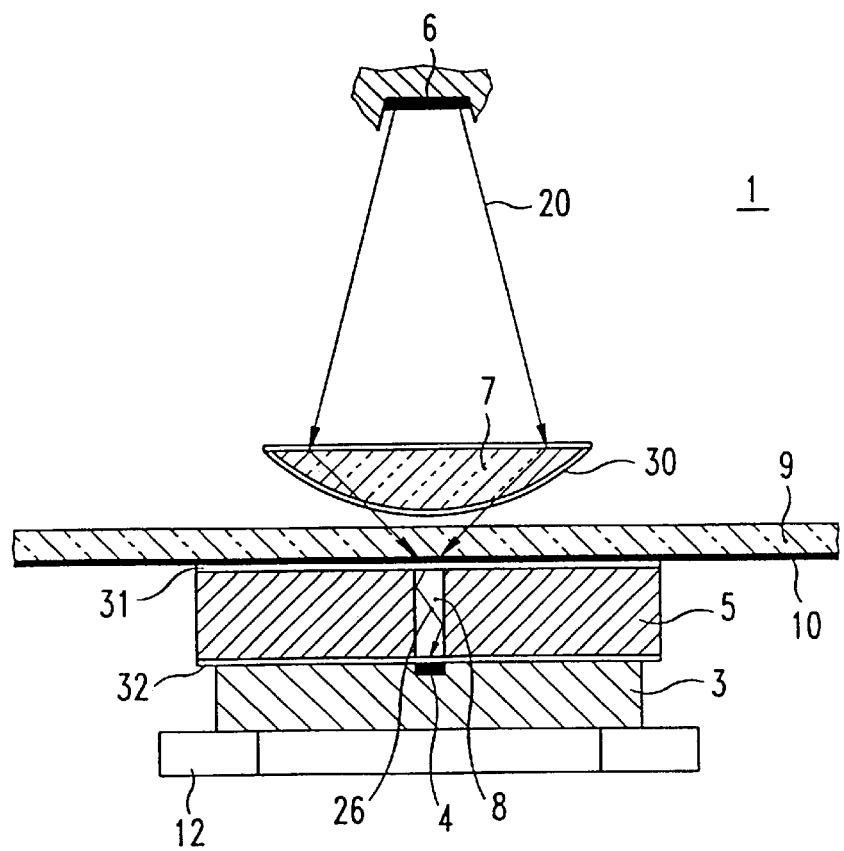
FIG. 3 shows a schematic diagram of a second embodiment of the inventive device viewed along a row.

Reflective layers for reflecting the stimulating radiation 20 can also be placed at different locations in the reading device of the invention. Such reflective layers need not be placed between the phosphor layer 10 and the optical fiber arrangement 5 in the manner illustrated with reference to the embodiment of FIG. 2. FIG. 3 shows schematically a diagram of a second embodiment of the reading device of the invention. The reading device 1 is shown as viewed along a row. One of the exemplary laser diodes 6 is illustrated, with the laser beam 20 being focused by the focusing lens 20 through the transparent carrier 9 on the phosphor layer 10. As mentioned above, the phosphor layer 10 is simulated by the stimulating radiation to emit an emission radiation which is conveyed through the optical fiber arrangement 5 to the linear CCD 3. One exemplary optical fiber 8 of the optical fiber arrangement 5 is illustrated in FIG. 3. The emission radiation 26 emitted by the phosphor layer is conveyed through the optical fiber 8 to a photodetector 4 of the linear CCD 3. An exemplary photodetector 4 representing the photodetectors of the linear CCD 3 is also illustrated in FIG. 3.

In the reading device 1 according to FIG. 3, a reflective layer 31 for reflecting the stimulating radiation 20 is arranged between the phosphor layer 10 and the optical fiber arrangement 5. In addition to this reflective layer 31, an additional reflective layer 32 for reflecting the stimulating radiation is provided between the optical fiber arrangement 5 and the linear CCD 3. These two reflective layers 31 and 32 operate in the same manner as the reflective layers 21 and 22 of the embodiment of FIG. 2. Alternatively, the reflective layer 31 arranged between the phosphor layer 10 and the optical fiber arrangement 5 may be replaced with one or more reflective layers provided exclusively between the optical fiber arrangement 5 and the linear CCD 3. It is technically easier to place the reflective layers, such as the reflective layer 32, between the optical fiber arrangement 5 and the linear CCD 3.

In the second embodiment of FIG. 3, a wavelength-selective reflective layer 30 for reflecting specific wavelength ranges of the stimulating radiation 20 is placed between the line light source, illustrated as one of the laser diodes 6, and the phosphor layer 10. In the second embodiment, the wavelength-selective reflective layer 30 is disposed on the focusing lens 7. Alternatively, the reflective layer may also be disposed at a different location between the line light source and the phosphor layer 10. It has been observed, that a line light source using a plurality of laser diodes for stimulating the phosphor layer 10 may also include a small amount of infrared radiation in addition to the wavelength ranges suitable for exciting the phosphor layer. The infrared wavelengths are not suitable for exciting the phosphor layer and tend to degrade the emission properties of the phosphor layer. It is therefore advantageous to prevent radiation in the infrared wavelength ranges from reaching the phosphor layer 10. This can be accomplished easily by incorporating a wavelength-selective reflective layer 30 in the optical path between the line light source and the phosphor layer.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A device (1) for reading information stored in a phosphor layer (10) comprising:
   a transparent carrier material (9) including the phosphor layer (10);
   a radiation source (2) for emitting an excitation radiation (20);
   a receiver (3) for receiving emission radiation (26) emitted by the phosphor layer (10), the radiation source (2) being arranged on one side of the carrier material (9) and the receiver (3) being arranged on the other side of the carrier material (9), so that an optical path is defined between the radiation source (2) and the receiver (3); and
   at least one thin reflective layer (21, 22; 30, 31, 32) disposed in the optical path between the radiation source (2) and the receiver (3) for reflecting at least a portion of the excitation radiation (20) away from said receiver.

2. The device according to claim 1, wherein the reflective layer (21, 22; 31, 32) is arranged between the phosphor layer (10) and the receiver (3) and reflects at least a portion of the excitation radiation into the phosphor layer.

3. The device according to claim 2, wherein an additional reflective layer (23) for reflecting emission radiation (26) emitted by the phosphor layer (10) is arranged between the radiation source (2) and the phosphor layer (10).

4. The device according to claim 1, wherein the reflective layer (30) is arranged between the radiation source (2) and the phosphor layer (10) and designed to reflect a wavelength range of the excitation radiation (20) which is not used to excite the phosphor layer (10).

5. The device according to claim 1, wherein the device includes at least two reflective layers (21, 22; 30, 31, 32), and wherein the first reflective layer (21, 22; 31, 32) is arranged between the phosphor layer (10) and the receiver (3) and the second reflective layer (30) is arranged between the radiation source (2) and the phosphor layer (10) and designed to reflect a wavelength range of the excitation radiation (20) not used to excite the phosphor layer (10).

6. The device according to claim 5, wherein the carrier material (9) and the phosphor layer (10) has a fixed location in the device (1).

7. The device according to claim 6, wherein the radiation source (2) is arranged on a side of the carrier material (9) facing away from the phosphor layer (10) and the receiver (3) is arranged on a side of the carrier material (9) facing towards the phosphor layer (10) there being a straight optical path between the radiation source and receiver; and between the phosphor layer (10) and the receiver (3) there is provided an optical imaging means (5) capable of capturing the emission radiation (26) emitted by the phosphor layer (10) and imaging the emission radiation (26) onto the receiver (3).

8. The device according to claim 7, wherein the imaging means (5) comprises optical waveguides.

9. The device according to claim 8, wherein the radiation source (2) is a line light source for exciting an individual row of the phosphor layer (10) and the receiver (3) comprises a plurality of pixels (4) for point-by-point reception of the emission radiation (26); and wherein the emission radiation (26) emitted by the excited row of the phosphor layer (10) can be simultaneously received by the pixels (4), so that the phosphor layer (10) can be read row by row.

10. The device according to claim 9, wherein the phosphor layer (10) comprises a needle-shaped crystalline structure.

11. The device according to claim 10, wherein the first reflective layer (32) is arranged between the imaging means (5) and the receiver (3).

12. The device according to claim 9, wherein the radiation source (2) and the receiver (3) are connected to each other; and wherein the device further comprises a driver (13) for providing a relative motion in a transport direction (B) between the radiation source (2), the receiver (3) and the phosphor layer (10).

13. The device according to claim 1, wherein an additional reflective layer (23) for reflecting emission radiation emitted by the phosphor layer (10) is arranged between the radiation source (2) and the phosphor layer (10) to reflect emission radiation back to the phosphor layer.

14. The device according to claim 1, wherein the reflective layer has a thickness equal to one quarter of the wavelength of the excitation radiation which is to be reflected by the reflective layer.

* * * * *